United States Patent [19]

Holtzman

[11] 4,405,963
[45] Sep. 20, 1983

[54] CAPACITOR APPARATUS WITH AN INDIVIDUAL DISCHARGE DAMPING DEVICE FOR EACH CAPACITOR UNIT

[75] Inventor: Barry L. Holtzman, Richland Township, Monroe County, Ind.

[73] Assignee: Westinghouse Electric Corp., Pittsburgh, Pa.

[21] Appl. No.: 291,747

[22] Filed: Aug. 11, 1981

[51] Int. Cl.³ .............................................. H02H 7/16
[52] U.S. Cl. ........................................ 361/16; 361/15; 361/113; 361/275
[58] Field of Search ....................... 361/16, 15, 17, 58, 361/113, 272, 275

[56] References Cited

U.S. PATENT DOCUMENTS

| | | | |
|---|---|---|---|
| 1,580,516 | 4/1926 | Marbury | 361/15 X |
| 2,619,521 | 11/1952 | Cuttino | 361/15 X |
| 2,636,921 | 4/1953 | Marbury | 361/16 X |
| 3,087,093 | 4/1963 | Bourgerie | 317/12 |
| 3,304,474 | 2/1967 | McClain | 361/275 |
| 3,497,771 | 1/1970 | Korkka | 317/12 |
| 3,654,511 | 4/1972 | Iwaya | 315/59 |
| 3,743,884 | 7/1973 | Wafer et al. | 315/36 |
| 3,840,787 | 10/1974 | Grahame | 317/256 |
| 4,028,592 | 6/1977 | Fahlen et al. | 317/12 A |

FOREIGN PATENT DOCUMENTS

| | | | |
|---|---|---|---|
| 620581 | 5/1961 | Canada | 361/16 |
| 2003949 | 11/1970 | Fed. Rep. of Germany | 361/16 |
| 107040 | 4/1943 | Switzerland | 361/15 |

OTHER PUBLICATIONS

"Linear Circuits", Part-2 by Scott, 1964–pp. 544–551, Addison-Wesley Publishing.

Primary Examiner—Patrick R. Salce
Attorney, Agent, or Firm—G. H. Telfer

[57] ABSTRACT

An individual capacitor unit has an individual discharge damping circuit, which may be contained within the unit housing, that is connected between a capacitor stack connection and a terminal of the unit. The damping device includes a predominantly resistive circuit path in parallel with a predominantly inductive circuit path.

7 Claims, 6 Drawing Figures

CAPACITOR APPARATUS WITH AN INDIVIDUAL DISCHARGE DAMPING DEVICE FOR EACH CAPACITOR UNIT

BACKGROUND AND SUMMARY OF THE INVENTION

This invention relates to capacitor apparatus in which individual capacitor units are each provided with a discharge damping device for high frequency discharges.

The invention has particular application to power capacitors, such as those which must sustain voltage levels in excess of 1000 volts in normal operation, such as are used for energy storage, power factor correction and series capacitor protection. The invention is particularly beneficial in such capacitors which have internal fuses.

Capacitors have a high efficiency which allows discharge and inrush currents caused by capacitors short circuiting and energization to persist for a time determined by circuit constants. The integral of the discharge current squared over time ($\int_0^\infty i^2 dt = I^2 t$) is a parameter used to describe the current's magnitude and duration.

In capacitor installations, it is known to use a damping impedance resistor in the discharge circuit to reduce the current duration and, hence, $I^2 t$. This has been done in capacitor apparatus in which lumped reactor-resistor combinations are used in the discharge circuit of an entire set or bank of capacitors. A drawback of such arrangements of lumped impedances is that an instance of a bushing flashover or bus flashover, as may affect an individual capacitor unit, but not an entire bank, will not be effectively dampened.

In the context of the present invention, an individual capacitor unit is one can or housing containing a plurality of capacitor sections that are interconnected in a manner to provide a given capacitance at the terminals which extend through the housing. In practice, a plurality of such units are interconnected to provide the bank or capacitor installation. The sections in a capacitor unit are normally connected in a series-parallel configuration. The functioning of an individual section of a unit, which may contain a number such as 20 or so sections, is not always vital to the operation of the unit because of paralleling of the sections. Therefore, it is sometimes the case that the individual sections in a unit have individual fuses. That is, the connections made to an individual winding section include a fusible element that will open upon an excess current rather than having an external fuse for an entire unit. When employing internal fuses, it is necessary that they be large enough, i.e., have enough $I^2 t$ capacity, such that they not melt or fail by fatigue when exposed to capacitor self-discharge currents as would be contemplated to occur occasionally in operation and which are not inherently harmful to the capacitive demands on the unit. Industry standards even require as a test the charging of the capacitor unit to 2.5 times the rated voltage (DC) and discharging into a minimum impedance circuit several times with no fuse operations. A commercially acceptable product must pass such tests. The internal fuses must be capable of withstanding such test and also have a low enough $I^2 t$ capability for voltage interruption in instances in which the dielectric materials of the particular section may be damaged during an interruption. These criteria impose severe restrictions on the proper selection of internal fuses and an object of the present invention is to permit an internally fused unit to be able to employ smaller fuses, with smaller $I^2 t$ capability, while being less subject to fuse operations on discharges of relatively high frequency.

The approach taken by the present invention is to minimize the $I^2 t$ of discharge and inrush currents by a damping device that minimizes the time during which such currents endure and to do so within each individual capacitor unit.

The discharge damping device in accordance with the present invention is preferably installed internal to the capacitor unit so it requires no assembly in the field and is not susceptible to damage in the field. The device basically consists of a series connected resistor paralleled by an inductance shunt connected between the stack of capacitor sections in the unit and one of the terminals extending through the housing. Proper selection of the impedances employed accomplishes a reduction in $I^2 t$ during high frequency discharge which reduces the duty on the capacitor and fuses, whether internal or external, and permits the use of smaller size fuses. This allowable reduction of fuse size is especially important and desirable for internally fused units. The invention further relates to the proper selection of the impedances and an economical and effective physical arrangement of such elements within each individual capacitor unit housing as may be employed in a capacitor installation. Preferably, the invention uses merely two conductors in the discharge damping device whose length and composition determines their resistance and inductance and which are connected in a parallel configuration to produce effective high frequency damping while introducing no appreciable losses at normal operating frequency.

DESCRIPTION OF THE PREFERRED EMBODIMENTS

Figure 1:
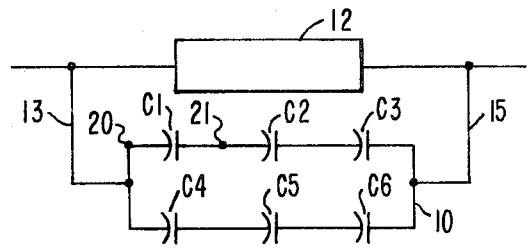
FIG. 1 is a general circuit schematic of a multi-unit capacitor installation whose performance is desirably improved by the practice of the present invention.

Referring to FIG. 1, in normal usage a capacitor installation 10 includes a plurality of individual capacitor units C1, C2, C3, C4, C5 and C6 in a series parallel configuration of which the example shown is merely by way of illustration. A typical capacitor installation could employ more parallel sets of units and more individual units. The installation provides sufficient capacitance for the intended puproses in relation to some electrical power system 12 with which it is connected. In past practice a form of discharge damping can be attained by the utilization of lumped reactor-resistor combinations in the leads 13 or 15. The use of such lumped impedances is avoided and their shortcomings are overcome by the practice of the present invention in which each of the several individual capacitor units C1-C6 is provided with its own discharge damping device, preferably arranged internally within a given capacitor unit housing.

Figure 2:
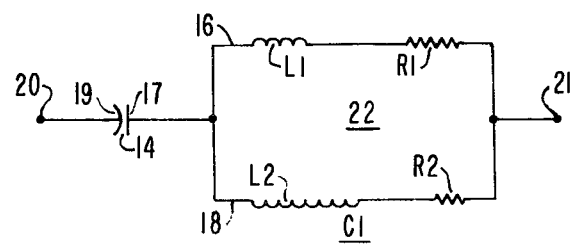
FIG. 2 is a circuit schematic of an embodiment of a single capacitor unit in accordance with the present invention.

FIG. 2 shows a circuit schematic of an individual capacitor unit such as C1 where the terminals 20 and 21 are the terminals extending through the unit housing and used for connection of unit C1 with the circuitry associated with it as illustrated in FIG. 1. Unit C1 includes a capacitor assemblage 14, to be further described hereinafter, which has connected between one electrode thereof and one of the unit terminals 21, a high frequency discharge damping device 22. The other capacitive electrode can be directly connected without appreciable impedance to the other terminal 20 of the unit.

The damping device comprises two parallel circuit paths 16 and 18 between the capacitive element 14 and the terminal 21. A first circuit path 16 comprises inductance L1 and resistor R1 but the inductance L1 is only that inherently present and is desirably minimized so that circuit path 16 is predominantly resistive. Circuit path 18 comprises inductance L2 and resistance R2 although in this instance the resistance R2 is only that inherently present in a highly conductive element and is desirably minimized so that circuit path 18 is predominantly inductive. Furthermore, the resistance R1 of circuit path 16 and the inductance L2 of circuit path 18 are related such that R1 is about equal to or less than $2\pi f(L2)$ where f is the frequency at which effective damping is desired. In usual power capacitor practice the range of frequency over which discharge damping is desirable is in the range of from about 10 kHz to about 50 kHz. Suitable impedances, for purposes of example, include R1 in the range of from about 0.03 ohm to about 0.6 ohm and L2 in the range of from about 0.5 microhenry to about 2 microhenries, where L1 is only about 0.05 microhenry to about 0.3 microhenry (or about an order of magnitude less than L2) and R2 is only about 0.001 ohm. The result is a resistor-inductor combination which has negligble losses at the normal operating frequency, such as 60 Hz, but is effectively a high impedance at capacitor discharge frequencies in the range of from about 10 to about 50 kHz.

The principles of the invention were verified in tests of an individual all-film capacitor unit having a plurality of sections including electrode foil materials in a winding with plastic film dielectric materials. The unit was rated at 7200 volts, 200 kVa and was charged to 4 kV DC and discharged into an external circuit having a total length of approximately 80 inches of a good conductive wire. The discharge frequency was about 30 kHz. The $I^2t$ as observed by an oscilloscope was arbitrarily designated as one per unit. A further test was made with the same capacitor under the same conditions but with an external damping device in accordance with the principles of this invention. A 20-inch length of lead wire was replaced with a copper lead 64 inches long and connected in parallel with a resistive wire 15 inches long, having an ohmic value of 0.14 and consisting of two parallel strands of 0.032 diameter Nichrohme wire 5.5 inches long with copper wire pigtails attached to each end. Upon the same discharge as the unit was previously subjected to, the oscilloscope wave form disappeared after three cycles, rater than six cycles as in the previously described test. The $I^2t$ was calculated to be only 0.35, thus only about one-third of that in the previous test without the invention. The losses of the device at 60 Hz and rated capacitor voltage would be about 0.001 watt and are insignificant.

Figure 3:
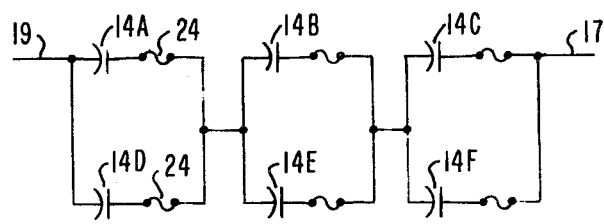
FIG. 3 is a further circuit schematic of the capacitive portion of the apparatus depicted in FIG. 2.

Referring to FIG. 3, the capacitive portion 14 of the capacitor unit C1 is illustrated to show the multi-section nature of the capacitor unit 14 in that it comprises a plurality of sections 14A, 14B, 14C, 14D, 14E and 14F which are connected in some sort of series-parallel configuration of which that illustrated is only for purposes of example as to the number and arrangement of sections. In this example, a fuse 24, referred to as an internal fuse, is associated with each of the capacitor sections 14A through 14F. The discharge damping device 22 permits each fuse 24 to be selected of smaller size and rating than if high frequency damping were not provided.

Figure 4:
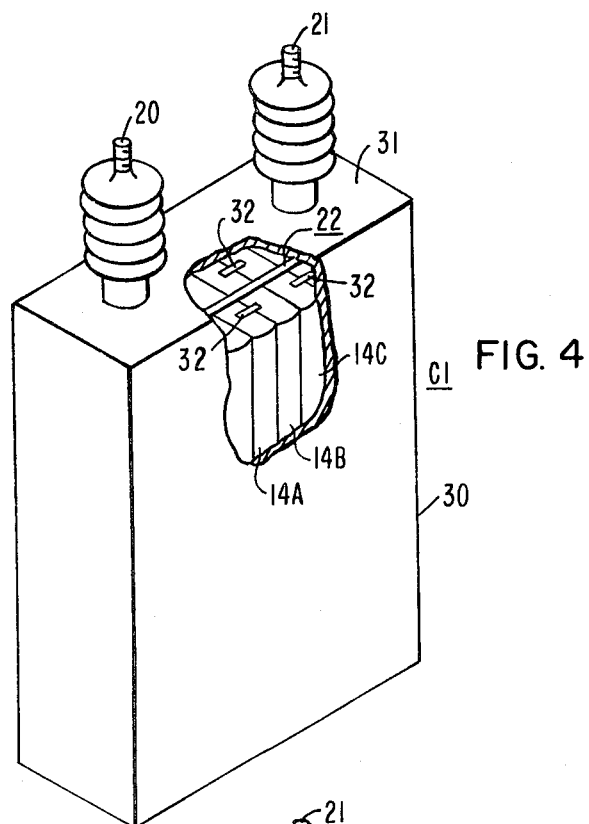
FIG. 4 is a perspective view, partly broken away, of a capacitor unit in accordance with an embodiment of the present invention.
Figure 5:
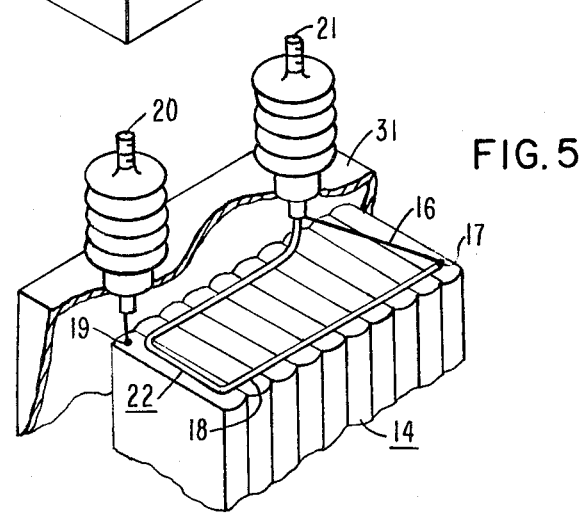
FIG. 5 is a partial perspective view, with certain elements displaced for illustrating an embodiment of a discharge damping device in a capacitor unit such as that of FIG. 4; and, FIG. 6 is a circuit schematic of a further embodiment of the invention.

The physical configuration of the elements is illustrated in FIGS. 4 and 5. FIG. 4 shows a capacitor unit C1 of the type to which the invention is directed. The unit C1 has a housing 30 having a top surface 31 through which a pair of terminals 20 and 21 extend, normally having bushings, as shown, on the exterior of the terminals. A plurality of capacitor sections such as those illustrated in FIG. 3 and including sections 14A, 14B and 14C are enclosed by the housing 30. The sections are in a stack running along the unit with various interconnections 32 made between the sections to provide the desired series-parallel interconnection. Normally a unit such as that described would include in each section a composite winding of foil electrode materials and dielectric sheet materials such as polypropylene film. The housing 30 would also contain an insulating fluid impregnant per usual practice.

In the view of FIG. 4 the discharge damping device 22 is only partly shown.

A fuller view is shown in FIG. 5 where the top surface 31 is shown lifted to expose the top of capacitive stack 14. Points 19 and 17 on the stack of capacitors, referred to as stack connection points, are provided for connection of the conductive elements leading from the stack 14 to the terminals 20 and 21. In prior practice there would simply be a direct conductive connection, without appreciable impedance, between each of the stack connection points 19 and 17 and respective terminals. In accordance with the present invention, the discharge damping device in accordance with this invention is provided which includes from one of the stack connection points 17 a resistive length 16 and from the same point 17 an inductive loop 18 on the top of the stack that forms sufficient inductance to provide that value for L2 as previously described.

By way of more specific example, units may have a discharge damping device 22 in which resistive lead 16 is a length of about 8 inches of No. 10 Nichrome alloy wire, giving a value for R1 of 0.04 ohms and L1 of 0.22 microhenry. Inductive lead 18 is a 36 inch length of No. 19 tinned copper wire (0.0234 in. diameter), giving an L2 value of about 1 microhenry. These conductors are individually insulated, except at connecting points, so they can be readily disposed on top of the capacitive stack 14 between the stack and the housing top 31.

Other forms of an internal damping device may be used. For example, inductive lead 18 could be looped down a side of the stack or elsewhere within the unit. If the damping device is mounted external to the unit, one form it could take is to have a normal short conductor between stack connection 17 and a housing terminal and the damping device would be between that terminal and an additional terminal for connecting with the equipment with which the unit is associated.

Figure 6:
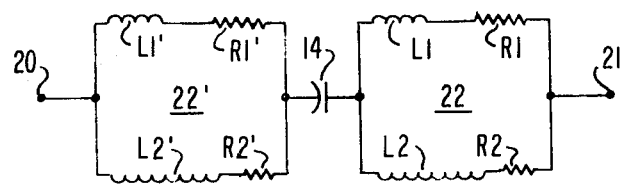

Among the various forms which the invention may take are those in which there are two, rather than merely one, discharge damping device in a unit. This would permit use of two damping devices associated with respective terminals of the capacitor unit with the individual impedances of smaller size than in the case of a single damping device. FIG. 6 illustrates a circuit schematic of such an arrangement. In device 22', R1' is large compared to R2' and L2' is large compared to L1'.

I claim:

1. A capacitor unit comprising:
   a stack of capacitor sections, each of said sections comprising a wound composite of dielectric sheet material and electrode material, said capacitor sections being interconnected and presenting a predetermined capacitance at first and second stack connection points;
   said stack being contained within a closed housing having a pair of terminals extending therethrough;
   a discharge damping device contained within said housing and connected between said first stack connection point and one of said pair of terminals, said discharge damping device comprising a predominantly resistive circuit path in parallel with a predominantly inductive circuit path for damping a high frequency discharge occurring across said terminals;
   said predominantly resistive circuit path of said discharge damping device comprising a length of resistive conductor extending substantially directly between said first stack connection point and said one of said pair of terminals; and said predominantly inductive circuit path comprising a length of low resistance conductor looped within the space between said first stack connection point and said one of said pair of terminals.

2. A capacitor unit in accordance with claim 1 wherein: said stack connection points are located on a top edge surface of said stack and said pair of terminals are located within a top surface of said housing; and said length of low resistance conductor of said predominantly inductive circuit path is looped within the space between said stack and said top surface of said housing.

3. A capacitor unit in accordance with claim 1 wherein: each of said capacitor sections has a fuse element connected in series with an electrode thereof.

4. A capacitor unit in accordance with claim 1 wherein: a second discharge damping device is contained within said housing and connected between said second stack connection point and the other of said pair of terminals.

5. A capacitor unit in accordance with claim 1 wherein:
   the resistance (R1) of said predominantly resistive circuit path and the inductance (L2) of said predominantly inductive circuit path are related such that R1 is about equal to or less than $2\pi f(L2)$ where f is the frequency at which effective damping is desired.

6. A capacitor unit in accordance with claim 5 wherein:
   said frequency (f) used for determination of values of R1 and L2 is in the range of from about 10 kilohertz to about 50 kilohertz.

7. A capacitor unit in accordance with claim 5 wherein:
   R1 is in the range of from about 0.03 ohm to about 0.6 ohm and L2 is in the range of from about 0.5 microhenry to about 2 microhenries.

* * * * *